US012743912B2

(12) United States Patent
Jones et al.

(10) Patent No.: US 12,743,912 B2
(45) Date of Patent: Sep. 22, 2026

(54) RISK REDUCTION SYSTEM AND METHOD FOR ONE OR MORE WORK MACHINES AT A WORKSITE

(71) Applicant: Deere & Company, Moline, IL (US)

(72) Inventors: Amy K. Jones, Asbury, IA (US); Anthony Herrera, Johnston, IA (US); Amit Naik, Corlim (IN); Mark T. Dolson, Asbury, IA (US); Jordan J. Hendriksen, Johnston, IA (US); Daniel J. Schimke, Waukee, IA (US); Adam J. Kolman, Bettendorf, IA (US)

(73) Assignee: Deere & Company, Moline, IL (US)

( * ) Notice: Subject to any disclaimer, the term of this patent is extended or adjusted under 35 U.S.C. 154(b) by 54 days.

(21) Appl. No.: 18/779,794

(22) Filed: Jul. 22, 2024

(65) Prior Publication Data

US 2026/0024384 A1 Jan. 22, 2026

(51) Int. Cl.

| | |
|---|---|
| ***G07C 5/06*** | (2006.01) |
| ***E02F 9/20*** | (2006.01) |
| ***E02F 9/22*** | (2006.01) |
| ***E02F 9/24*** | (2006.01) |
| ***E02F 9/26*** | (2006.01) |

(52) U.S. Cl.

CPC .............. *G07C 5/06* (2013.01); *E02F 9/2025* (2013.01); *E02F 9/2253* (2013.01); *E02F 9/24* (2013.01); *E02F 9/26* (2013.01)

(58) Field of Classification Search

CPC ........ G07C 5/06; E02F 9/2025; E02F 9/2253; E02F 9/24; E02F 9/26

See application file for complete search history.

(56) References Cited

U.S. PATENT DOCUMENTS

| | | | | |
|---|---|---|---|---|
| 8,467,928 | B2 * | 6/2013 | Anderson | G05D 1/00 701/1 |
| 8,818,567 | B2 * | 8/2014 | Anderson | G05D 1/24 701/41 |
| 11,656,595 | B2 | 5/2023 | Allison et al. | |
| 11,800,829 | B2 | 10/2023 | Sidon et al. | |
| 12,140,915 | B1 * | 11/2024 | McCarson | G06F 18/217 |
| 2010/0063651 | A1 * | 3/2010 | Anderson | G05D 1/24 701/1 |
| 2012/0029761 | A1 * | 2/2012 | Anderson | G05D 1/00 701/29.3 |
| 2015/0149047 | A1 | 5/2015 | Kubota et al. | |
| 2016/0078363 | A1 | 3/2016 | Hodel et al. | |

(Continued)

FOREIGN PATENT DOCUMENTS

| | | |
|---|---|---|
| IN | 441847 B | 7/2023 |

*Primary Examiner* — Tyler J Lee

(57) ABSTRACT

A system and method for risk reduction during operation of a work machine at a worksite comprises a processor that performs the following operations. The operation includes receiving a location information indicating a geographic position of the work machine on a worksite, receiving a series of alert event information generated by monitoring systems, employing machine learning algorithms or predefined rules to classify each alert event into one or more predetermined categories of information, assigning a unique indicator to each classified alert event based on the classification of the alert event information in the series. The processor then receives the unique indicators and generates a report based on a count basis for display on a user interface.

19 Claims, 8 Drawing Sheets

(56) References Cited

U.S. PATENT DOCUMENTS

| | | | |
|---|---|---|---|
| 2016/0098637 | A1 | 4/2016 | Hodel et al. |
| 2018/0224808 | A1 | 8/2018 | Tong et al. |
| 2020/0007540 | A1 | 1/2020 | Kawaguchi et al. |
| 2023/0295899 | A1 | 9/2023 | Yamada et al. |
| 2023/0360193 | A1* | 11/2023 | Kounosu .............. G06Q 10/063 |
| 2023/0392351 | A1 | 12/2023 | Matsui et al. |
| 2025/0207365 | A1* | 6/2025 | Hanson ..................... E02F 9/26 |

* cited by examiner

400

RISK REDUCTION SYSTEM AND METHOD FOR ONE OR MORE WORK MACHINES AT A WORKSITE

TECHNICAL FIELD

The present disclosure relates to risk reduction system and method for one or more work machines at a worksite.

BACKGROUND

With the myriads of technological features and data creation with work machines, the dynamics of managing multiple work machines at a worksite remain complex. A common goal is to optimize productivity and efficiency. However, this must be balanced with risks associated with work performance. Variables such as location, ground materials, grading, residential areas, pedestrian traffic, etc. can have an impact directly or indirectly. Therein lies an opportunity for the dynamic management of risks.

SUMMARY

According to an aspect of the present disclosure, a system for risk reduction during operation of a work machine at a worksite comprises at least one processor, at least one non-transitory computer readable medium with machine executable code which when executed by at least one processor causes the processor to perform the following operations. The operation includes receiving a location information indicating a geographic position of the work machine on a worksite, receiving a series of alert event information generated by monitoring systems of the work machine when deployed at the worksite. The processor employs machine learning algorithms or predefined rules to classify each alert event into one or more predetermined categories of information. Next, the processor assigns a unique indicator to each classified alert event based on the classification of the alert event information in the series. The processor then receives the unique indicators and generates a report based on a count basis for display on a user interface.

The classified alert event information comprises one or more of a deceleration rate exceeding a threshold alert, a harsh brake engagement alert, an auto brake engagement alert, a person detection alert, an object detection alert, and an inclination exceeding a threshold alert. The unique indicators displayed on the user interface is representative of a limited time interval.

The report comprises of a thematic map of the worksite with one or more overlays, wherein each overlay includes the unique identifier from each classified alert event at the sensed geographic position. The thematic map of the worksite comprises a heat map, a proportional symbol map, or a dot density map. The electronic data processor is further configured to generate a control signal to modify a work machine parameter when the count of an alert event exceeds a defined number.

Modifying the work machine parameter comprises one or more of limiting a work machine travel speed, altering a work machine route, and modifying an audible alert. The electronic data processor is further configured to generate a control signal to modify a work machine parameter based on a risk level wherein the risk level is derived from a weighted count of an alert event based on the associated risk. The electronic data processor is further configured to broadcast the report to other work machine on the worksite. The electronic data processor further generates a set of clusters, wherein each particular cluster in the set of clusters includes a subset of the unique indicators assigned to the particular cluster based on a variable associated with the alert event.

A method of risk reduction of a work machine at a worksite includes receiving a location information data indicating a geographic position of the work machine and receiving a series of alert event information data generated by monitoring systems on the work machine when deployed at the worksite. The method further includes employing machine learning algorithms or predefined rules to classify each alert event into one or more predetermined categories of information and assigning a unique indicator to each classified alert even based on the classification of the alert event information in the series. The method further includes receiving the unique indicators and generating a report displaying the unique indicator on a user interface on a count basis and weighted based on the level of risk.

The classified alert event information comprises one or more of a deceleration rate exceeding a threshold alert, a harsh brake engagement alert, an auto brake engagement alert, a person detection alert, an object detection alert, and an inclination exceeding a threshold alert. The unique indicators are displayed on a user interface is limited to a time interval.

The method further comprises a display, on a user interface, of a thematic map of the worksite with one or more overlays, wherein each overlay includes the unique identifier from each classified alert event at the sensed geographic location. The thematic map of the worksite comprises a heat map, a proportional symbol map, or a dot density map. The electronic data processor is further configured to generate a control signal to modify a work machine parameter when the count of the alert event exceeds a defined number. Modifying the work machine parameters comprises one or more of limiting a work machine travel speed, altering a work machine route, and modifying an audible alert. The electronic data processor is further configured to broadcast on of the classified alert event and the report to other work machines on the worksite. The electronic processor further generates a set of clusters based on the alert event information data, wherein each particular cluster in the set of clusters includes a subset of unique indicators assigned to the particular cluster based on a variable associated with the alert event.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

The present description generally relates to reducing risks associated with a work machine or a series of work machines at a worksite.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Generally, a control system 104 (or multiple control systems) may be provided, for control of various aspects of the operation of the work machine, in general). The control system 104 (or others) may be configured as a computing device with associated processor devices and memory architectures, as a hard-wired computing circuit (or circuits), as a programmable circuit, as a hydraulic, electrical or electro-hydraulic controller, or otherwise. As such, the control system may be configured to execute various computational and control functionality with respect to the work machine. In some embodiments, the control system may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the control system 104 (or a portion thereof) may be configured as an assembly of hydraulic components (e.g., valves, flow lines, pistons and cylinders, and so on), such that control of various devices (e.g., pumps or motors) may be affected with, and based upon, hydraulic, mechanical, or other signals and movements.

Figure 1:
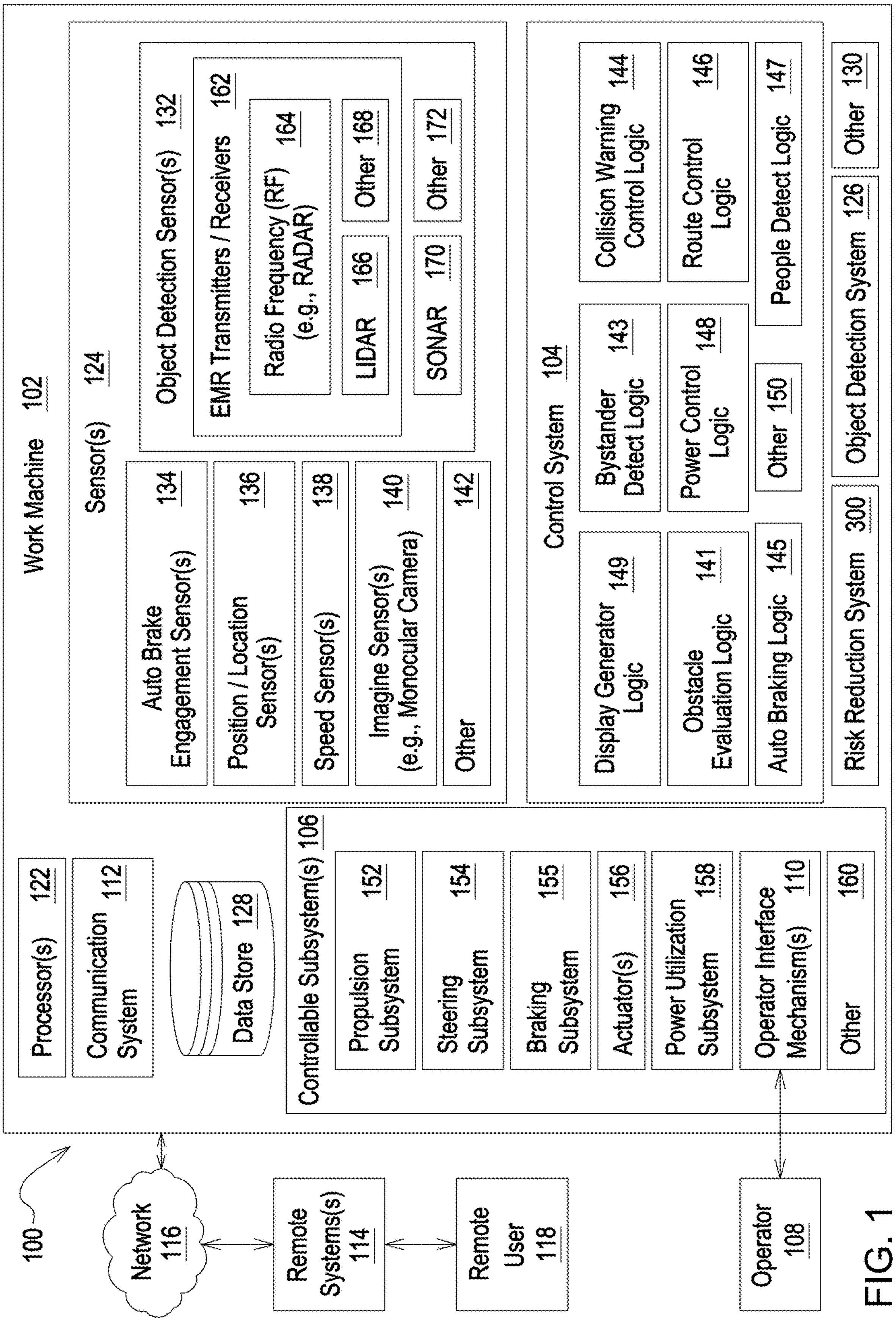
FIG. 1 is a block diagram showing one example of a work machine architecture that includes the risk reduction system.

The control system 104 may be in electronic, hydraulic, mechanical, or other communication with various other systems or devices of the work machine (or other machinery). For example, the control system 104 may be in electronic or hydraulic communication with various actuators, sensors, and other devices within (or outside of) the work machine, including various devices associated with the pumps, valves, and so on. The control system 104 may communicate with other systems or devices (including other controllers) in various known ways, including via a CAN bus (not shown) of the work machine, via wireless or hydraulic communication means, or otherwise. An example location for the control system 104 is depicted in FIG. 1. It will be understood, however, that other locations are possible including other locations on the work machine, or various remote locations.

FIG. 1 is a block diagram showing one example of a work machine architecture 100 that includes a work machine 102. Work machine 102 includes a control system 104 configured to control a set of controllable subsystems 106 that perform operations on a worksite. For instance, an operator 108 can interact with and control work machine 102 through a user interface 110. User interface mechanism(s) 110 can include such things as a steering wheel, pedals, levers, joysticks, buttons, dials, linkages, etc. In addition, they can include a user interface that displays user actuatable elements, such as icons, links, buttons, etc. Where the device is a touch sensitive display, those user actuatable items can be actuated by touch gestures. Similarly, where mechanism(s) 110 includes speech processing mechanisms, then operator 108 can provide inputs and receive outputs through a microphone and speaker, respectively. User interface mechanism(s) 110 can include any of a wide variety of other audio, visual or haptic mechanisms.

Work machine 102 includes a communication system 112 configured to communicate with other systems or machines in architecture 100. For example, communication system 112 can communicate with other local machines, such as other machines operating on a same worksite as work machine 102. In the illustrated example, communication system 112 is configured to communicate with one or more remote systems 114 over a network 116. Network 116 can be any of a wide variety of different types of networks. For instance, it can be a wide area network, a local area network, a near field communication network, a cellular communication network, or any of a wide variety of other networks, or combinations of networks.

A remote user 118 is illustrated as interacting with remote system 114, such as to receive communications from or send communications to work machine 102 through communication system 112. For example, but not by limitation, remote user 118 can receive communications, such as notifications, requests for assistance, etc., from work machine 102 on a mobile device.

FIG. 1 also shows that work machine 102 includes one or more processors 122, one or more sensors 124, an object detection system 126, a data store 128, and can include other items 130 as well. Sensor(s) 124 can include any of a wide variety of sensors depending on the type of work machine 102. For instance, sensors 124 can include object detection sensor(s) 132, brake engagement sensors 134, position/location sensors 136, speed sensors 138, worksite imaging sensors 140, and may include other sensors 142 associated with risk. However, the ones listed above are of primary relevance.

Brake engagement sensors 134 are configured to detect and measure the position or movement of the brake components. The brake engagement sensors 134 allow for continuous monitoring of the brake system to provide the data associated with identification and feedback for deviations from steady state operation, such as sudden or harsh braking. The brake engagement sensor(s) 134 generate an electrical signal that corresponds to the position or status of the brakes. This signal is then transmitted to the control system 104 to interpret the signal to determine the brake engagement, monitor the braking performance, or activate a safety feature based on the detected brake position or degree of brake engagement.

Position/location sensors 136 are configured to identify a position/location of work machine 102 at a worksite. This includes global positioning systems (GPS) or a more localized tracking method at a worksite corresponding to an anchored point as the work machine 102 traverses the worksite. In the latter embodiment, sensors 136 are configured to generate signals indicative of an angle or turn radius of machine 102. This can include, but is not limited to, steering angle sensors, articulation angle sensors, wheel speed sensors, differential drive signals, gyroscopes, to name a few.

Imaging sensors 140 are configured to obtain images of the worksite, which can be processed to identify objects or conditions of the worksite 105. Examples of imaging sensor(s) 140 include, but are not limited to, a camera (e.g., a monocular camera, stereo camera, etc.) that obtains still images, a time-series of images, and/or video feed of an area of a worksite 105. For instance, the field of view (FOV) of the camera includes an area of the worksite 105 that is to the rear of the work machine 102, and which may not otherwise be visible to operator 108 while in the operator compartment or cab 214 of machine 102.

Object detection sensors 132 can include electromagnetic radiation (EMR) transmitters and receivers (or transceiver(s)) 162. Examples of EMR transmitters/receivers include radio frequency (RF) devices 164 (such as RADAR), LIDAR devices 166, and can include other devices 168 as well. Object detection sensors 132 can also include sonar devices 170 and can include other devices 172 as well.

Control system 104 can include settings collision warning control logic 144, route control logic 146, power control logic 148, display generator logic 149, auto braking logic 145, obstacle awareness logic 141, bystander detect logic 143, people detect logic 147, and it can include other items 150. Controllable subsystems 106 can include propulsion subsystem 152, steering subsystem 154, braking subsystem 155, one or more different actuators 156 that can be used to change machine settings, machine configuration, etc., power utilization subsystem 158, and it can include a wide variety of other systems 160, some of which are described below. In one example, controllable subsystems 106 include user interface mechanism(s) 110, such as display devices 215, audio output devices, haptic feedback mechanisms, as well as input mechanisms.

Collision warning control logic 144 can control one or more of subsystems 106 in order to change machine settings based upon objects, conditions, and/or characteristics of the worksite. By way of example, settings control logic 144 can actuate actuators 156 that change the operation of braking subsystem 155, propulsion subsystem 152, and/or steering subsystem 154.

Auto braking logic 145 can control one or more subsystems configured to automatically engage the brakes without operator intervention to avoid an imminent collision. Auto braking control logic generates control signals to control braking subsystem(s) 155 based on sensor data once the auto braking logic 145 assesses the level or risk associated with a detected object, person, or obstacle. Auto braking logic 145 evaluates factors such as proximity, relative speed, and trajectory to determine the severity of the potential collision. Once assessed if the risk level exceeds a set criterion and a collision is likely, auto braking logic 145 initiates the braking process. The risk reduction system 300 identifies this as an alert event.

Obstacle awareness logic 141 generates control signals to actuate one or more subsystems to automatically provide alerts or warning to the operator to increase awareness a detected object, person, or obstacle. Obstacle awareness logic 141 by providing awareness to an operator of the surrounding environment and reduce risks associated with collisions within vicinity of the work machine during operation. The alerts may comprise one or more of a visual alert, an auditory alert, a haptic alert, a heads-up display alert, or a voice alert, for example.

People detect logic 147, associated with the obstacle awareness logic 141, generates controls signals to actuate one or more subsystems to identify and detect the presence of persons in the vicinity of the work machine. Sensors and advanced image processing techniques are used to analyze the surrounding environment and identify human figures or movement to assist in preventing pedestrian-related accidents. The feature extraction may be derived from human figure detection, position, velocity, speed, direction, and trajectory of the feature. These persons may be classified as persons expected to be present. Bystander detection logic 143 differentiates from people detect logic 147 by identifying persons who are present but are not actively involved in operation. They may be identified as persons not intended to be present at the worksite. Both people detect logic 147 and bystander detection logic 143 generate a control signal to identify and detect the presence of persons in the vicinity of the work machine.

Route control logic 146 can control steering subsystem 154. By way of example, but not by limitation, if an object is detected by object detection system 126, route control logic 146 can control propulsion subsystem 152 and/or steering subsystem 154 to avoid the detected object.

Power control logic 148 generates control signals to control power utilization subsystem 158. For instance, it can allocate power to different subsystems, generally increase power utilization or decrease power utilization, etc. These are just examples, and a wide variety of other control systems can be used to control other controllable subsystems in different ways as well.

Display generator logic 149 illustratively generates a control signal to control a display device 215, to generate a user interface display 215 for an operator 108. The display can be an interactive display with user input mechanisms for interaction by operator 108.

Object detection system 126 is configured to receive signals from object detection sensor(s) 132 and, based on those signals, detect objects proximate machine 102 on the worksite, such as in a rear path of machine 102. Object detection system 126 can therefore assist operator 108 in avoiding objects while backing up. Before discussing object detection system 126 in further detail, an example of a work machine will be discussed with respect to FIG. 2.

Figure 2:
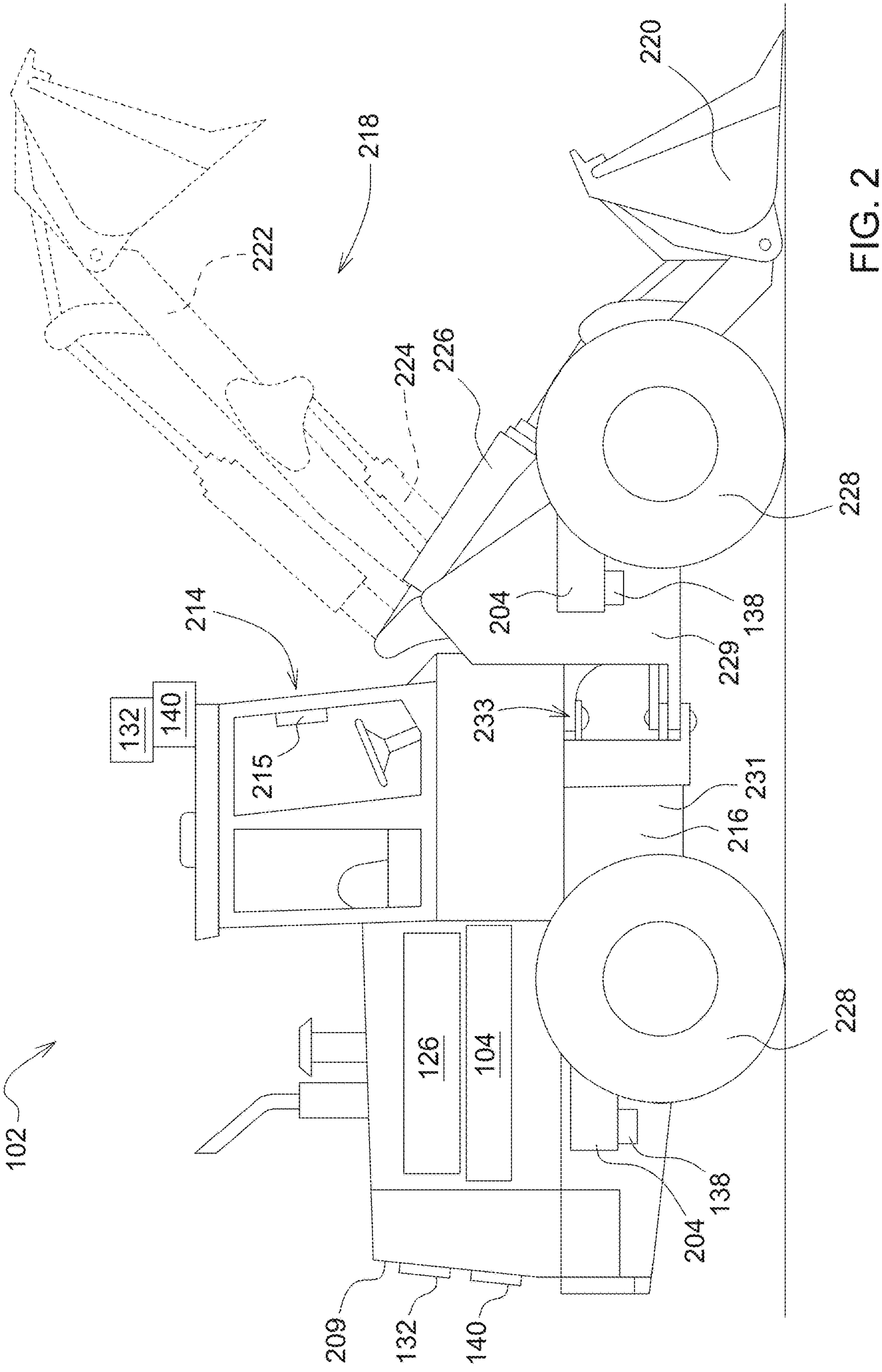
FIG. 2 is a pictorial representation of one embodiment of a work machine.

As noted above, work machines can take a wide variety of different forms. FIG. 2 is a pictorial illustration showing one example of a work machine 102, in the form of an off-road construction vehicle, with an object detection system 201 (e.g., system 126) and a control system 104. While machine 102 illustratively comprises a wheel loader, a wide variety of other work machines may be used as well. This can include other construction machines (e.g., bull dozers, motor graders, etc.), agricultural machines (e.g., tractor, combine, etc.), to name a few.

Work machine 102 includes a cab 214 having a display device 215, ground-engaging element(s) 228 (e.g., wheels), motor(s) 204, speed sensor(s) 206, a frame 216, and a boom assembly 218. Boom assembly 218 includes a boom 222, a boom cylinder 224, a bucket 220 and a bucket cylinder 226. Boom 222 is pivotally coupled to frame 216 and may be raised and lowered by extending or retracting boom cylinder 224. Bucket 220 is pivotally coupled to boom 222 and may be moved through an extension or retraction of bucket cylinder 226. During operation, work machine 102 can be controlled by an operator within cab 214 in which work machine 102 can traverse a worksite. In one example, each one of motor(s) 204 are illustratively coupled to, and configured to drive, wheel(s) 228 of work machine 102. Speed sensor(s) 206 are illustratively coupled to each one of motor(s) 204 to detect a motor operating speed.

In the illustrated example, work machine 102 comprises an articulating body where a front portion 229 is pivotably connected to a rear portion 231 at a pivot joint 233. An articulation sensor can be utilized to determine the articulation angle, at pivot joint 233, which can be used to determine the path of work machine 102. In another example in which the body of work machine 102 is non-articulating, the angle of the front and/or rear wheels 228 is rotatable relative to the frame.

Object detection system 126 detects objects located within a range of work machine 102. In the illustrated example, system 126 receives signals from object detection sensor(s) 132 and from imaging sensor(s) 140 (e.g., a monocular camera) which are illustratively mounted at a rear end 209, fore portion, and any periphery of machine 102. The components of system 201 and/or system 202 communicate over a CAN network of work machine 102, in one example.

Object detection sensor(s) 132 are configured to send a detection signal from rear end 209, the fore portion or any periphery of the machine 102 and receives reflections of the detection signal to detect one or more objects behind machine 102. In one example, the detection signal comprises electromagnetic radiation transmitted to the rear of machine 102. For instance, this can include radio frequency (RF) signals. Some particular examples include radar and LORAN, to name a few.

In other examples, object detection sensor(s) 132 utilize sonar, ultrasound, as well as light (e.g., LIDAR) to image objects. Example LIDAR systems utilize ultraviolet light, visible light, and/or near infrared light to image objects.

Of course, other types of object detectors can be utilized. In any case, object detection system 126 generates outputs indicative of objects, which can be utilized by control system 104 to control operation of work machine 102.

Some work machines utilize a backup camera which displays a rear view from the machine to the operator, along with a radar system that provides audible indications on the presence of an object behind the machine.

Further yet, some machine systems that utilize CAN communication may have limited bandwidth to communicate over the CAN bus. Thus, a signal received from a radar object detection system 126 may include limited information regarding the tracked object, providing low quality information. Accordingly, the system is unable to determine size information, or range/angular resolution, increasing the likelihood of false positive detections. FIG. 2 is a block diagram of an example work machine architecture 100 including the work machine 102 shown in FIG. 1, with portion illustrated in more detail. Thus, FIG. 2 shows that the work machine 102 can include one or more processors, a communication system 112, sensors (which can be the same or different with respect to the sensors from those described above with respect to FIG. 1), map/processor/generator system, in situ data collection system, work machine actuator(s) 156, (e.g. a controllable subsystem 106), user interface mechanisms 110, data store 128, control system 104, and it can include a wide variety of other items as well.

Figure 3:
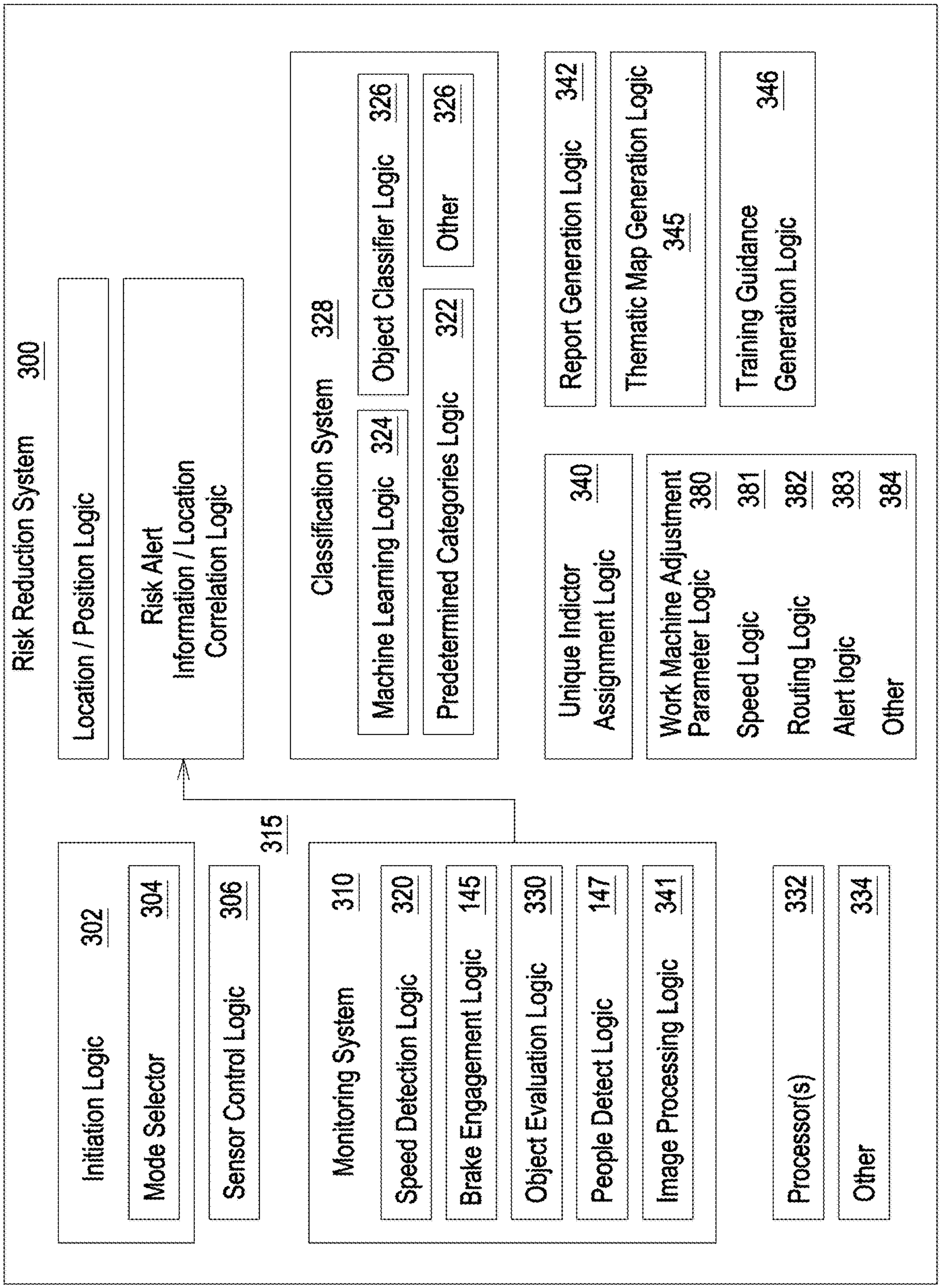
FIG. 3 is a block diagram illustrating one embodiment of the risk reduction system.

FIG. 3 illustrates one example of a risk reduction system 300. System 300 comprises of at least one processor, at least one non-transitory computer readable medium with machine executable code which, when executed by the at least one processor, causes the at least one processor 122 to perform operations that include the following. The system 300 is configured to associate location or position information 305 received from position/sensors (such as sensors 136), and alert event information 315 received from monitoring systems 310 that receive signals from speed sensors 138 using speed detection logic 320, object detection sensors 132 using object evaluation logic 330, auto brake engagements sensors 134 using brake engagement logic 145, and imaging sensors 140 using people detect logic 147 to bystander detection logic 147 using alert event information/location information correlation logic 335.

Object evaluation logic 330 uses signals generated from a sensor 132 to detect objects, and their respective locations, relative to the work machine. Also, the objects detected by object detection system 126 can be fused with the images acquired by the imaging sensors 140, in order to provide the operator an indication of where in the image frames the detected objects are located. This can enable the operator to quickly determine whether a detected object is a false positive, a true positive that the operator is already aware of, or a true positive that the operator was not aware of. Also, system 126 facilitates a wider coverage area for object detection without significantly increasing the detection of false positives.

Alert event information 315 and position information correlation logic 316 is configured to determine a location of the alert event detected by logic 335. Alert event/position information correlation logic 335 is configured to correlate the alert event 315 determined by the monitoring system 310 with position information captured by the position sensor.

Accordingly, report generation logic 342 can generate reports for the operator to provide awareness of objects in the vicinity of the work machine. The report generation logic 342 can further advantageously leverage the position/location information 305 with alert event information 315 to aggregate information for visual presentation to the operator, or a worksite manager if aggregating information from more than one work machine at a worksite 105, such as a thematic map 345. Alternatively, training guidance generation logic 346 may be provided based on the aggregation of alert event information 315 to identify operators potentially in need of training on a specific work machine type, job type, or material form. The granularity of the alert event information 315 advantageously provides opportunities to improve efficiencies at a worksite 105 (as related to time or fuel efficiencies, for example).

Risk assessment system 300 includes initiation logic 302 configured to initiate and control the risk assessment performed by system 300. For example, this can be in response to a mode selector 304 determining that the machine 102 has been deployed at a worksite 105. Alternatively, the mode selector 304 can select when risk assessment system 300 is initiated to aggregate data over a particular time interval or time period, or alternatively engage specific settings (e.g. fully enabled system, people detect only mode). This can be in response to changing topographies or soil conditions of the landscape (e.g. residential or open landscape).

Sensor control logic 306 is configured to control object detection sensors 132, imaging sensors 140, brake engagement sensors 134. Logic 306 controls sensors 132 to transmit detection signals and to receive corresponding reflections of the detection signal, which is used by object detection the object detection system 126 to detect the presence of objects using object evaluation logic 330 or people detect logic 147 on the worksite and identify locations where brake engagement occurs.

Object evaluation logic 330 is configured to perform vision recognition on the images, to evaluate the objects detected by the object detection system 126. Illustratively, object detection system 126 includes image processing logic 341 configured to perform image processing on the image and object evaluation logic 330 configured to evaluate the object based on the image processing performed by logic 341. This can include, but is not limited, object size detection, object shape detection, object classification performed by a classification system 328, an object classifier 326 using one or more of an evolving machine learning logic 324 and a predetermined categories logic 322, can include other items 326 as well.

Machine learning logic 324 illustratively generates recommendations on object classification 326, and predetermined categories 322 to achieve priorities selected by an operator. Machine settings and parameters can include a focus with or without object detection systems, or speed variation, or pedestrian traffic. These are examples only. Machine learning logic 324 can learn from the alert event information 315 and identify bystanders, or static structures, or areas of high pedestrian traffic, or areas of increased work machine traffic. The machine learning logic 324 can further follow the risk reduction system changes in setting, alerts, or routings, and record the conditions and outcomes of those settings. This can trigger new settings adjustment rules, object classifier rules, or changes in predetermined categories if successful in increasing desired performance of machine 102. Furthermore, as machine learning logic 324 is in communication with a large number of machines, it can look for a consensus across the work machines using specific rules/machine settings and change priorities based on those observations centrally.

Figure 5:
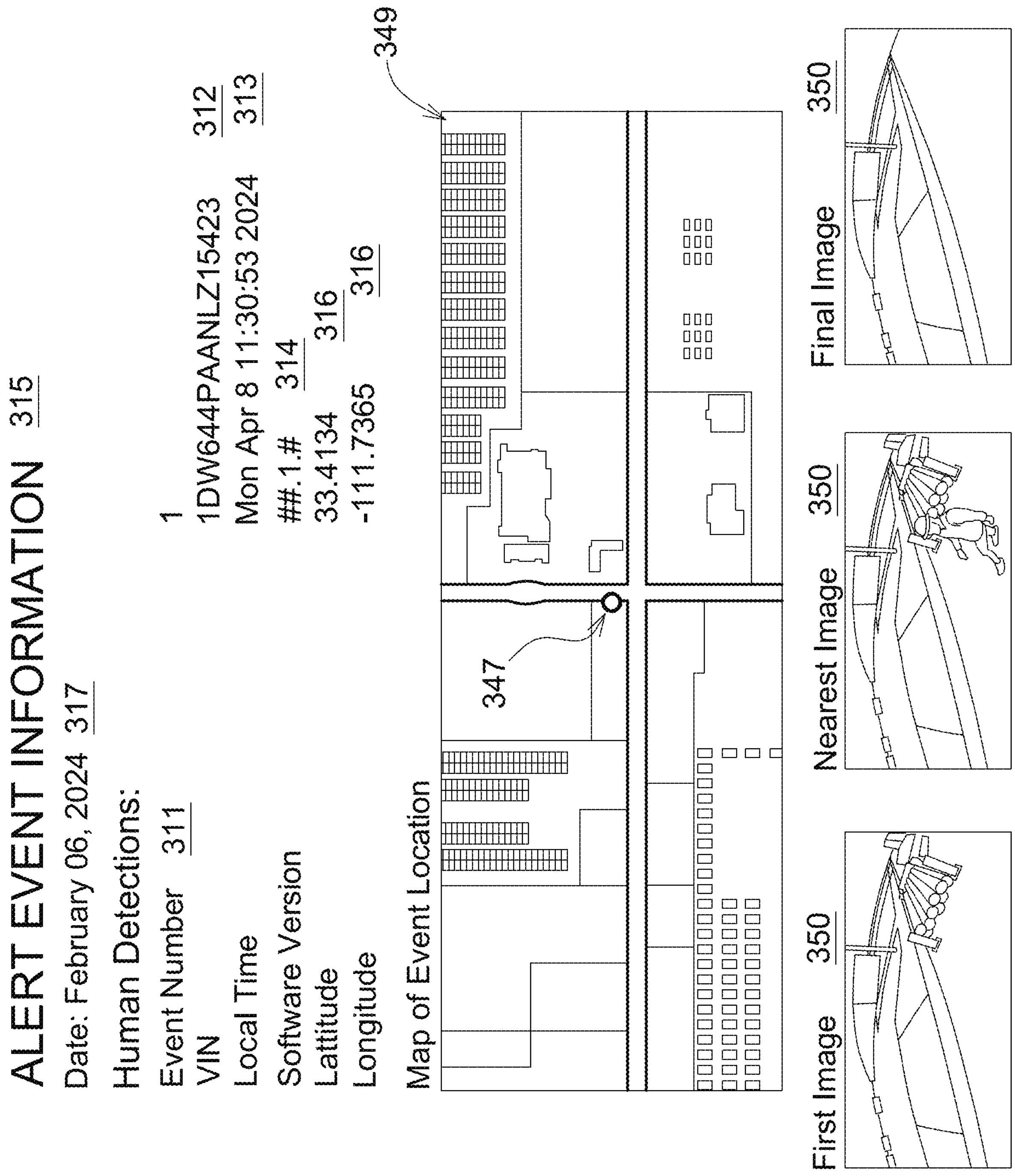
FIG. 5 is one exemplary embodiment of a report generated from the risk reduction system depicting an alert event for a work machine.

Unique indicator assignment logic 340 can utilize information from the object classifier 326 to assign visually distinctive indicators or descriptors to the detected objects for display on a thematic map 345 (shown in FIG. 7) or a map 349 (shown in FIG. 5). Such visual indicators or descriptors can provide a variety of different types of information regarding each alert event.

For example, according to certain embodiments, FIG. 5 displays a schematic of alert event information 315 associated with a single incident from a single work machine 102. The alert invention information 315 may disclose an incident number 311, a vehicle identification number 312, a time 313, a software version 314 and a location stamp 316. The alert event information 315 further discloses a bird's eye view of the position/location as represented by a unique identifier 347 representing the type of incident (i.e. a harsh braking, a person detected, an objected detected, to name a few) on a map 349, alongside an image snapshot 350 from one or more cameras at the time of the alert event. The map 349 can be derived from location/position information such as a GPS. In one exemplary embodiment, the image snapshot 350 may comprise of sequential images of the alert event as a first image, a nearest image, and a final image (e.g. a pedestrian walking by). In another exemplary embodiment, the image snapshot 350 may comprise of an instantaneous snapshot fed from each respective camera. Now referring back to the unique identifier 347 shown on the map 349, the unique identifier can be visual indicators, such as, for example, colors and/or hatch or fill patterns, and can be utilized to indicate whether the object detected is a bystander, a standing object, or dynamic movement, or something associated with sudden operational changes on the work machine such as the harsh braking. For example, a first color, such as for example red, and/or a first hatch or fill pattern 701, can be utilized to indicate detected objects is a bystander. Similarly, second and third colors, such as, for example, blue and yellow, and/or a second and third hatch or fill patterns 702, 703, respectively, can be utilized to indicate harsh braking incidents. Alternatively, a fourth and fifth hatch or fill pattern 704, 705, respectively, can be utilized to indicate alert events associated each with a different work machine, Additionally, while FIG. 5 shows the alert invent information 315 shown as a unique identifier 347 as having generally round or oval shapes, the unique identifier 347 can be configured to display a representation of the actual shape of the associated work machine, and/or if the alert event 315 is a detected object, provide an indication of the size, or a relative size, of the detected object. The report may also disclose the date 317 the report was generated.

The risk reduction system 300 further includes work parameter adjustment logic 380 configured to use the aggregated alert event information 315 from one or more work machines at the worksite 105 over a period of time, or a project phase, wherein the logic can further optimize efficiencies using speed logic 381, routing logic 382, alert setting logic 383, among other 384 things. This can be the alert event information 315 aggregated from a single work machine, a single operator, the aggregate of all similar work machines at worksite, the aggregate of all work performed by work machines at worksite, e.g.

Routing logic 382 is configured to determine a path of the work machine and is configured to generate control signals, either by itself or in conjunction with control system 104. System 300 is illustrated as having one or more processors 332 and can include other items 334 as well extrapolate a future route that work machine is traveling. Route sensor 230 can identify the route of work machine 102 in other ways as well, or alter the route based on the input alert event information 315.

Speed logic 381 is configured to limit speed at certain geographical locations, or alternatively during certain forms of operation (e.g. steep grades, ground material variations, etc.) and thereby adjusting work machine behavior.

Alert setting logic 383 is configured to modify audible alert settings or omit alert settings based on recurring instances of location or operation performed. This is particularly advantageous during repetitive motions in residential or industrial worksites (as opposed to open fields).

Figure 4:
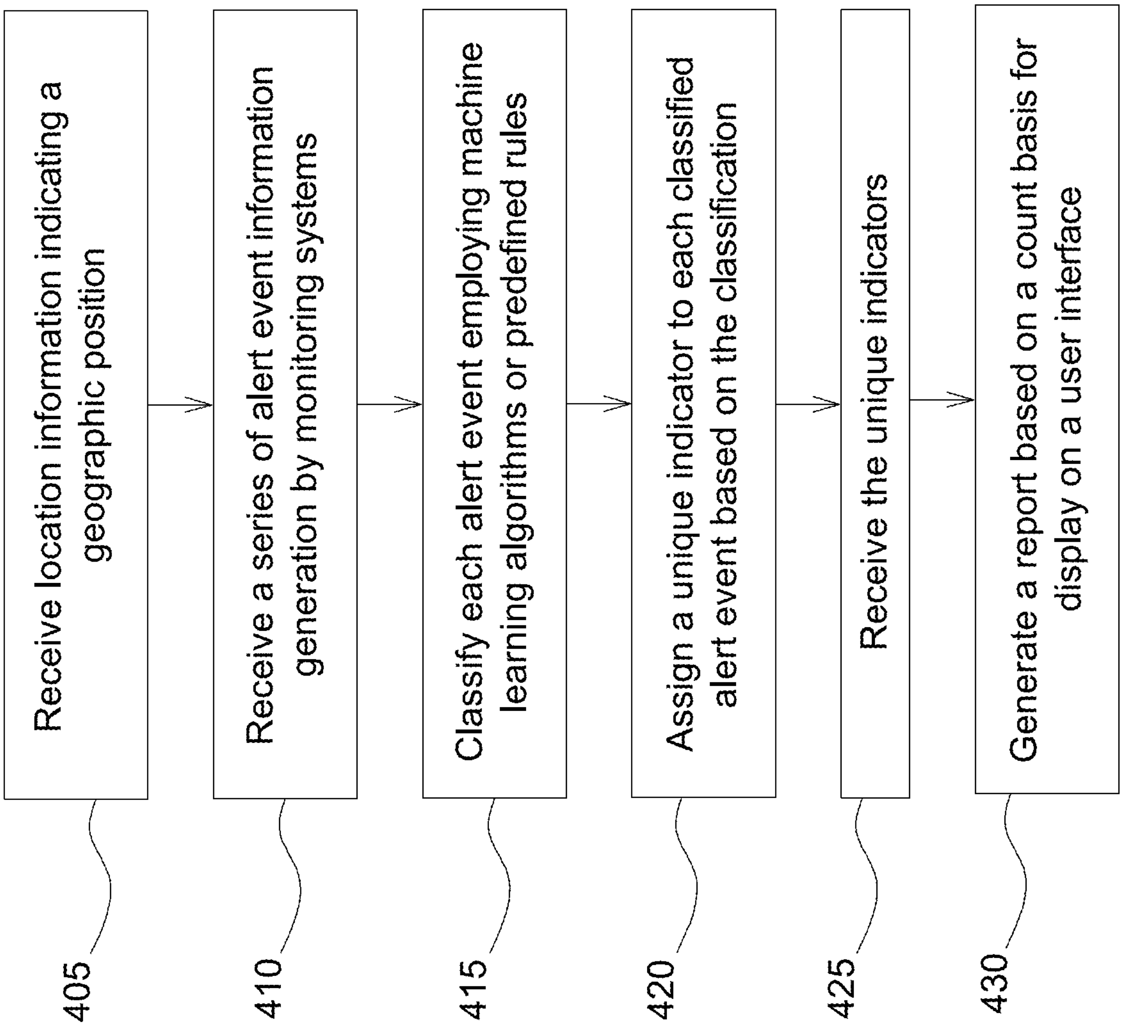
FIG. 4 is a flow diagram of a method of assessing risks of a work machine at a worksite.

FIG. 4 illustrates a method 400 for risk assessment and subsequent opportunities for risk reduction during operation of a work machine at a worksite, according to an exemplary embodiment. FIG. 3 will be described from the perspective of the work machine control system 104. However, it will be understood that the work machine control system 104 performs the following function with the aid of the processor 332 executing corresponding computer-readable instructions stored in the memory 124.

At step 405, the work machine control system 104 receives location information indicating a geographic position of a work machine 102 on a worksite. The location information may be received from a location sensor 136 allowing for accurate positioning and navigation, which are essential for mapping and precision operation. The location sensor may be GPS receiver, a differential GPS, IMUs, Lidar, to name a few.

At step 410, the work machine control system 104 receives a series of alert event information generated by monitoring systems 310 on the work machine 102 when deployed at the worksite 105.

At step 415, the work machine control system 104 employs machine learning algorithms or predefined rules to classify each alert event into one or more predetermined categories of information.

At step 420, the work machine control system assigns a unique indicator to each classified alert event based on the classification of the alert event information in the series.

At step 425 and subsequently 430, the work machine control system receives the unique indicators, and generates a report based on a count basis 805 for display on a user interface.

The classified alert event information comprises one or more of a deceleration rate exceeding a threshold alert (e.g. to identify a harsh brake engagement), an auto brake engagement alert, a person detection alert, an object detection alert, and an inclination exceeding a threshold alert. Assessing whether a sudden change in speed is attributed to a harsh braking due to a risk associated event (e.g. pedestrian traffic) or a sudden change in incline can be correlated by also tracking the incline.

The unique indicators displayed on the user interface is representative of a defined time interval (e.g. per day, per month, per project period, or per crew shift, to name a few). The report 542 comprises of a thematic map of the worksite with one or more overlays, wherein each overlay includes the unique identifier from each classified alert event at the sensed geographic position. The thematic map of the worksite may comprise of a heat map, a proportional symbol map, or a dot density map, to name a few.

A heat map provides a data visualization technique using color to represent the magnitude of values in a data set. This form of a thematic map enables the display of the concentration of risk alert events on a worksite, thereby revealing hot spots for modifying the behavior of work machine operation and parameters.

A dot density map functions similarly to a heat map. The dot density map provides allows for a more precise visualization and thereby identifying boundaries for risk reduction (e.g. concentrations of persons, path planning, crowding of objects).

Similarly, a proportional symbol map utilizes unique indicators proportional in size to the data value found at the location.

The electronic data processor is further configured to generate a control signal to modify a work machine parameter when the count of an alert event exceeds a defined number. In another embodiment, the count basis 805 may be weighted according to the associated risk. For example, pedestrian alert event may be weighted more heavily than object alert events. The generated report 542 may display the level of risk as derived from the weighted counts.

The electronic data processor is further configured to broadcast the report 542 to other work machines on the worksite.

The electronic data processor generates a set of clusters based on the type of thematic map, wherein each particular cluster in the set of clusters includes a subset of the unique indicators assigned to the particular cluster based on a variable associated with the alert event.

Figure 6:
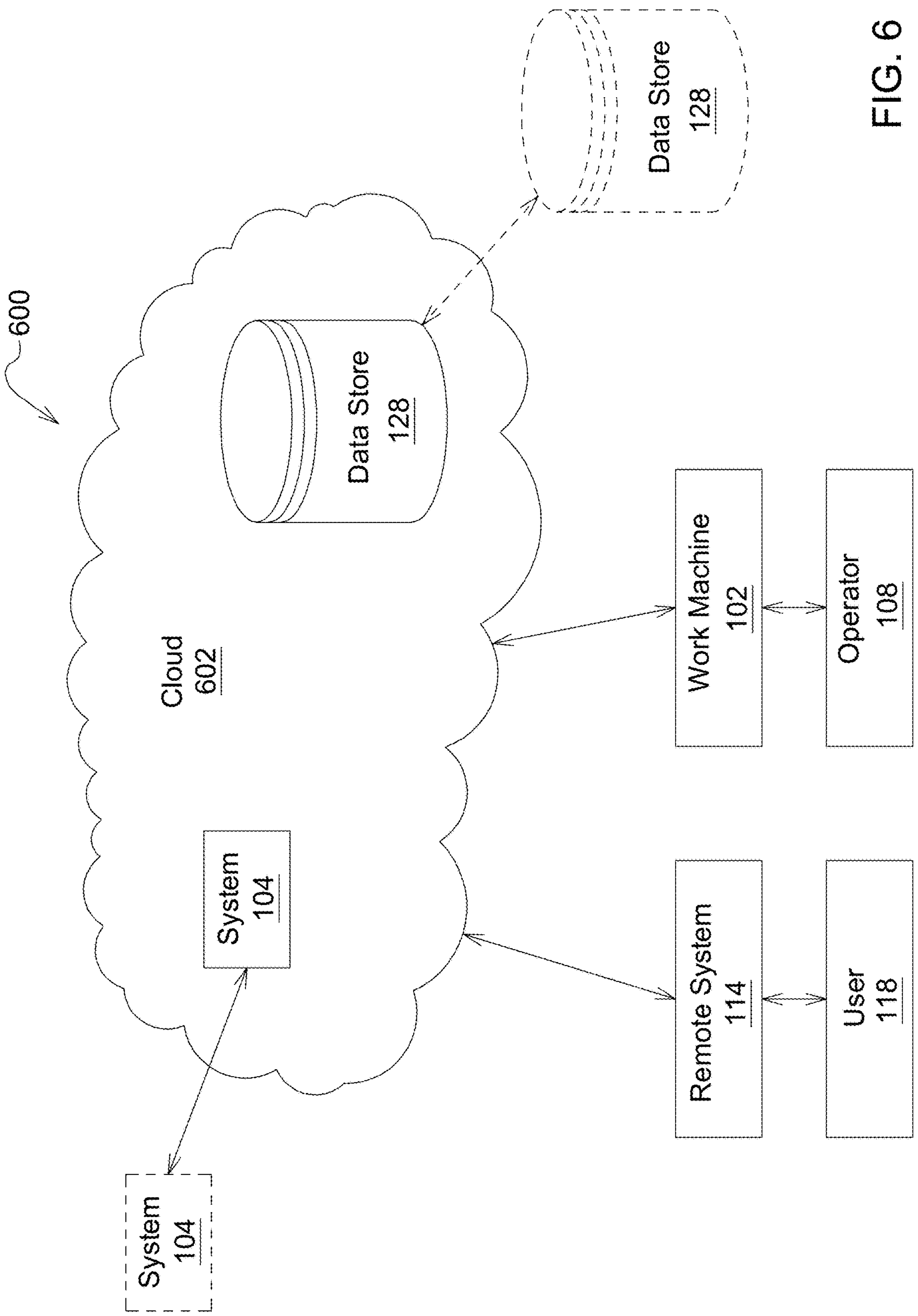
FIG. 6 is a block diagram showing one example of architecture illustrated in FIG. 1, deployed in a remote server architecture.

FIG. 6 is a block diagram of one example of work machine architecture 100, shown in FIG. 1, where work machine 102 communicates with elements in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network, and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIG. 1 and they are similarly numbered. FIG. 6 specifically shows that system 126 and data store 128 can be located at a remote server location 702. Therefore, work machine 102 accesses those systems through remote server location 702.

FIG. 6 also depicts another example of a remote server architecture. FIG. 6 shows that it is also contemplated that some elements of FIG. 1 are disposed at remote server location 702 while others are not. By way of example, data store 128 can be disposed at a location separate from location 702 and accessed through the remote server at location 702. Alternatively, or in addition, system 126 can be disposed at location(s) separate from location 702 and accessed through the remote server at location 702.

Regardless of where they are located, they can be accessed directly by work machine 102, through a network (either a wide area network or a local area network), they can be hosted at a remote site by a service, or they can be provided as a service, or accessed by a connection service that resides in a remote location. Also, the alert event information data 315 can be stored in substantially any location and intermittently accessed by, or forwarded to, interested parties. All these architectures are contemplated herein. Further, the information can be stored on the work machine 102 until the work machine enters a covered location. The work machine, itself, can then send and receive the information to/from the main network, thereby enabling the aggregation of data from a multitude of work machines to create a comprehensive report of a worksite. It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

As discussed above, some a thematic map 542 created from alert information data 315 correlated with position/location information (such as aerial imagery data or historical data) can create a report in several forms to assist a work machine.

In one example, the control system receives a thematic map and generates control signals based upon that thematic map 542, by clustering variable values mapped to different geographic locations on the worksite through a clustering algorithm. Some clustering methods are optimized for the particular application such grading, or roadbuilding. A purely statistical clustering mechanism can assign a particular space to a cluster, and then an adjacent space to a different cluster.

Figure 7:
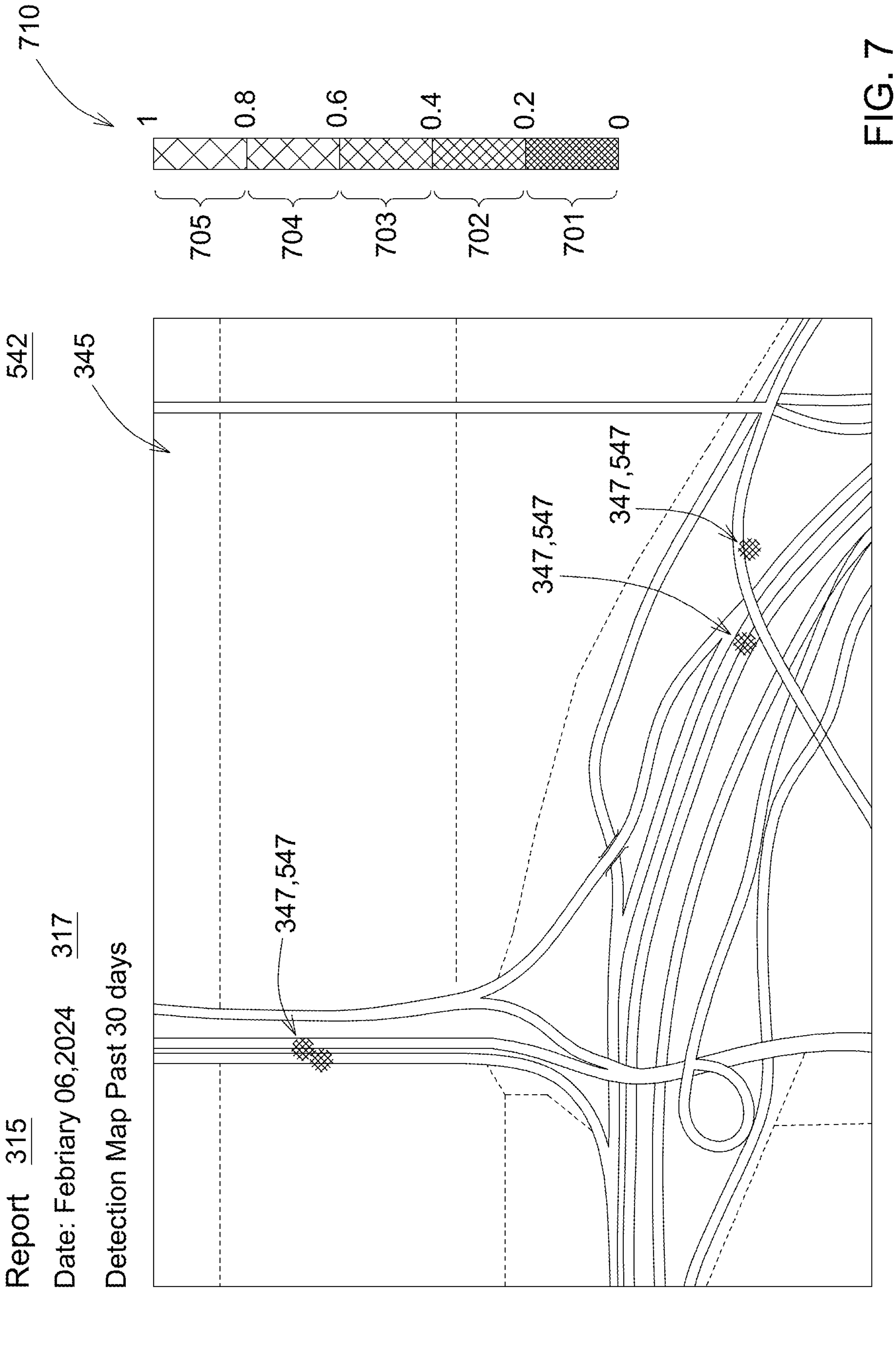
FIG. 7 is a first embodiment of a display showing aggregate information from a worksite, shown here as a thematic map.
Figure 8:
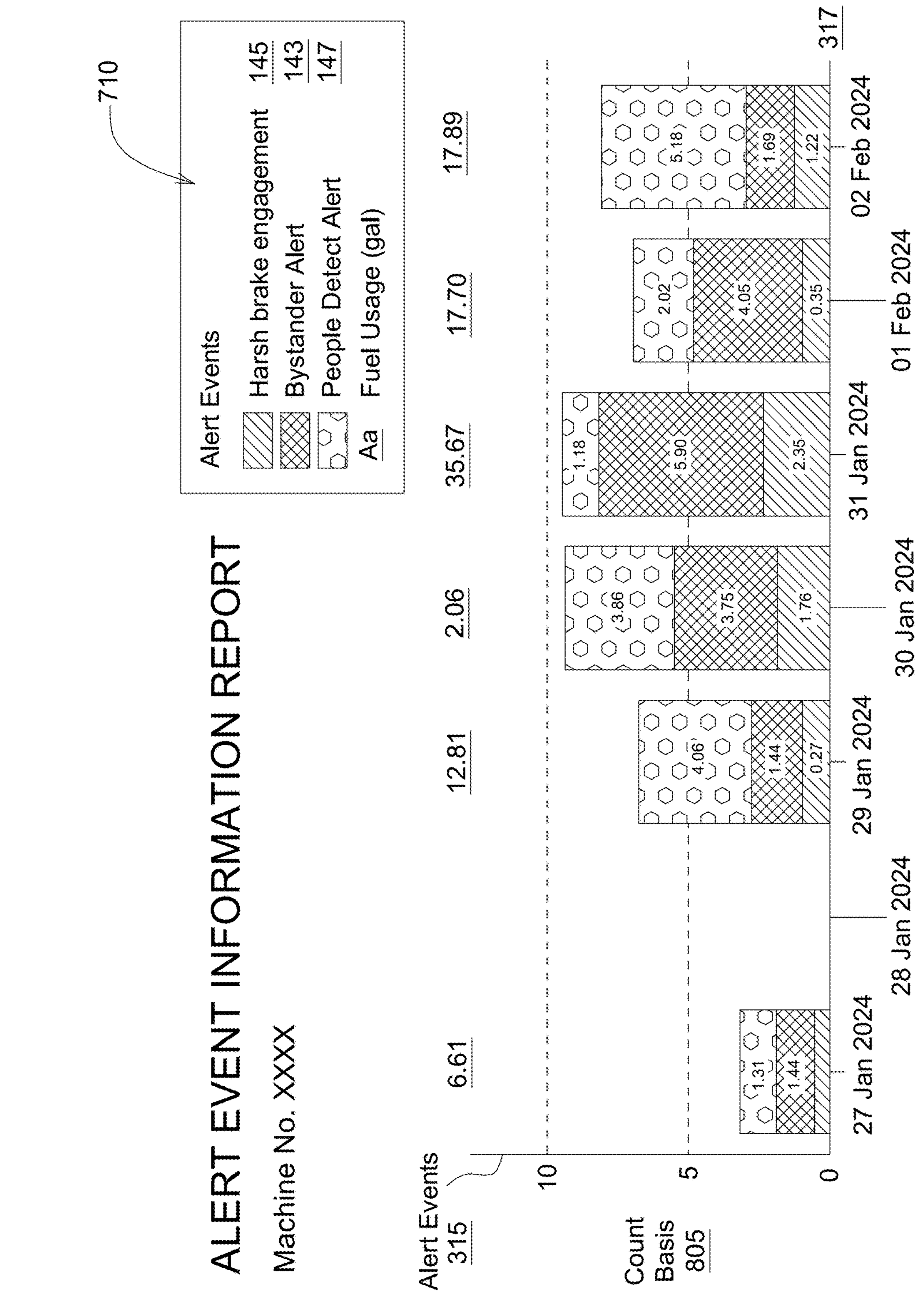
FIG. 8 is a second embodiment of a display showing aggregate information from a worksite, shown here as a bar a graph.

FIGS. 7 and 8 illustrate examples of a clustering approach using k-means clustering. Using an example k-means clustering approach, the points are hard assigned to one of the clusters, i.e. each data point is determined to belong to one specific cluster. This results in numerous areas of the field having frequent changes in cluster assignment. To illustrate, FIG. 7 an aerial view of a worksite 105 with road systems. FIG. 7 also shows a legend 710 which illustrates that variable values on the map of the worksite 105 have been clustered into five different value ranges, which are represented by values ranging in between zero and one in legend 710. Thus, the variable values have been divided or clustered into five different value ranges based on a criterion (e.g., decile ranges, equal ranges between the low and high values, etc.). At each of the cluster boundaries, changes to the machine parameter settings are made based on corresponding control settings. These changes can result in risk reduction.

FIG. 7 illustrates one example of a cluster application as applied the thematic map. FIG. 8 illustrates another example of a cluster application as applied to a bar graph over time.

Clustering logic 404 applies a clustering algorithm to generate clusters. Any of a wide variety of different types of clustering algorithms can be utilized. For instance, clustering logic 404 can include k-means clustering, fuzzy clustering (e.g., fuzzy C-means), to name a few. Clustering logic 404 also includes cluster assignment logic 418 configured to assign points or regions of the thematic map 542 to particular clusters. Logic 404 can include other items as well. Cluster generation system is also illustrated as including one or more processors 122.

Fuzzy C-means clustering is utilized to generate clusters with associated probabilities. Briefly, however, fuzzy clustering includes a form of clustering in which each data point can belong to more than one cluster. This clustering involves assigning data points to the clusters (e.g. the cluster magnitude and/or density being based on a count basis 805), such that items in the same cluster are as similar as possible (or at least have a threshold similarity) while items belonging to different clusters are as dissimilar as possible (or at least have a threshold dissimilarity). Clusters are identified using similarity measures based on the alert event type.

FIG. 8 discloses a risk assessment graph associated with a particular work machine over the course of a week, wherein each alert event is documented on a count basis 805. The x-axis denotes a time basis (day, time, etc.). The y-axis denotes the count basis of alert event stacked in bar graph form.

What is claimed is:

1. A system for risk reduction during operation of a work machine at a worksite, comprising:
- at least one electronic data processor operatively coupled to the work machine;
- at least one non-transitory computer readable medium with machine executable code which, when executed by the at least one electronic data processor, causes the at least one electronic data processor to perform operations including:
  - receiving from a location sensor, a location information indicating a geographic position of the work machine on the worksite;
  - receiving from a monitoring subsystem of the work machine, a series of alert event information data generated by the monitoring subsystem on the work machine when deployed at the worksite;
  - employing machine learning algorithms or predefined rules to classify each alert event from the alert event information data into one or more predetermined alert categories of information associated with a different operational risk levels;
  - assigning a unique indicator to each classified alert event based on a classification of the alert event information;
  - aggregating the unique indicators over a defined time interval and based on the geographic position to generate a risk representation of the worksite; and
  - generating a control signal, based on the aggregated unique indicators, to automatically modify a work machine parameter.

2. The system of claim 1, wherein the classified alert event information comprises one or more of a deceleration rate exceeding a deceleration threshold alert, a harsh brake engagement alert, an auto brake engagement alert, a person detection alert, an object detection alert, and an inclination exceeding an inclination threshold alert.

3. The system of claim 1, wherein the electronic data processor is further configured to perform operations comprising:
- generating a report of the aggregated unique indicators correlated with the geographic positions for display on the user interface.

4. The system of claim 3, wherein the report comprises of a thematic map of the worksite with one or more overlays, wherein each overlay includes a unique identifier associated with the classification of alert event information at the sensed geographic position.

5. The system of claim 4, wherein the report comprises of a thematic map of the worksite wherein the thematic map may include a heat map, a proportional symbol map, or a dot density map.

6. The system of claim 1, wherein the electronic data processor is further configured to generate a control signal to automatically modify a work machine parameter when the count of the alert event exceeds a defined number.

7. The system of claim 1, wherein modifying the work machine parameter comprises one or more of limiting a work machine travel speed, altering a work machine route, and modifying an audible alert.

8. The system of claim 1, wherein the predetermined alert categories of information associated with a different operational risk levels are weighted.

9. The system of claim 3, wherein the electronic data processor is further configured to broadcast the report to other work machines on the worksite.

10. The system of claim 3, wherein the electronic data processor further generates a set of clusters, wherein each particular cluster in the set of clusters includes a subset of the unique indicators assigned to the particular cluster based on a variable associated with the alert event, the report including the set of clusters.

11. A method of risk reduction of a work machine at a worksite, the method comprising:
- receiving a location information data from a location sensor, indicating a geographic position of the work machine on the worksite;

receiving a series of alert event information data generated by the monitoring subsystems on the work machine when deployed at the worksite;

employing machine learning algorithms or predefined rules to classify each alert event into one more predetermined alert categories of information associated with a different operational risk levels;

assigning a unique indicator to each classified alert event based on the classification of the alert event information data;

aggregating the unique indicators over a defined time interval and based on the geographic position to generate a risk representation of the worksite;

generating a report displaying the unique indicators on a user interface on a count basis, the unique indicators weighted based on a level of risk; and generating a control signal to automatically modify a work machine parameter when the count of the alert event exceeds a defined number.

12. The method of claim 11, wherein the classified alert event information data comprises one or more of a deceleration rate exceeding a deceleration threshold alert, a harsh brake engagement alert, an auto brake engagement alert, a person detection alert, an object detection alert, and an inclination exceeding an inclination threshold alert.

13. The method of claim 11, wherein the unique indicators displayed on the user interface is limited to the time interval.

14. The method of claim 11, wherein the report comprises of a thematic map of the worksite with one or more overlays, wherein each overlay includes a unique identifier from each classified alert event information data at a sensed geographic location.

15. The method of claim 14, wherein the report comprises of a thematic map of the worksite comprises a heat map, a proportional symbol map, or a dot density map.

16. The method of claim 11, wherein modifying the work machine parameters comprises one or more of limiting a work machine travel speed, altering a work machine route, and modifying an audible alert.

17. The method of claim 11, wherein the electronic data processor is further configured to broadcast one of the classified alert event and the report to other work machines on the worksite.

18. The method of claim 11, wherein the electronic data processor further generates a set of clusters, wherein each particular cluster in the set of clusters includes a subset of the unique indicators assigned to the particular cluster based on a variable associated with the alert event, the report including the set of clusters.

19. A system for risk reduction during operation of a work machine at a worksite, comprising:

at least one electronic data processor;

at least one non-transitory computer readable medium with machine executable code which, when executed by the at least one electronic data processor, causes the at least one electronic data processor to perform operations including:

receiving, from a location sensor, a location information indicating a geographic position of the work machine on a worksite;

receiving, from a monitoring subsystem of the work machine, a series of alert event information data generated by the monitoring system on the work machine when deployed at the worksite;

employing machine learning algorithms or predefined rules to classify each alert event into one or more predetermined alert categories of information associated with different operation risk levels;

assigning a unique indicator to each classified alert event based on the classification of the alert event information in the series;

aggregating the unique indicators over a defined time interval and based on the geographic position to generate a risk representation of the worksite;

generate a control signal to modify a work machine parameter based on the alert event information;

generate a set of clusters based on the classified alert event information correlated with one of a location information and a time information; and display the set of clusters on a report.

* * * * *